US005243852A

United States Patent [19]

Morita

[11] Patent Number: 5,243,852

[45] Date of Patent: Sep. 14, 1993

[54] FAILURE DIAGNOSIS DEVICE FOR AN AUTOMOTIVE ENGINE

[75] Inventor: Shigeki Morita, Himeji, Japan

[73] Assignee: Mitsubishi Denki Kabushiki Kaisha, Tokyo, Japan

[21] Appl. No.: 684,726

[22] Filed: Apr. 15, 1991

[30] Foreign Application Priority Data

Apr. 17, 1990 [JP] Japan ........ 2-102062

[51] Int. Cl.[5] ........ G01M 15/00

[52] U.S. Cl. ........ 73/117.3; 73/116

[58] Field of Search ........ 73/116, 117.2, 117.3; 364/431.03, 431.12

[56] References Cited

U.S. PATENT DOCUMENTS

| | | | |
|---|---|---|---|
| 4,825,373 | 4/1989 | Nakamura et al. | 364/431.03 |
| 4,829,440 | 5/1989 | Abe | 364/431.12 |
| 4,970,492 | 11/1990 | King | 364/424.03 |
| 4,975,847 | 12/1990 | Abe et al. | 73/116 |
| 4,989,150 | 1/1991 | Tazawa | 364/431.03 |
| 5,062,294 | 11/1991 | Iwata | 73/115 |

FOREIGN PATENT DOCUMENTS

| | | |
|---|---|---|
| 1737 | 1/1989 | Japan . |
| 14528 | 3/1989 | Japan . |

*Primary Examiner*—Hezron E. Williams
*Assistant Examiner*—George M. Dombroske
*Attorney, Agent, or Firm*—Sughrue, Mion, Zinn, Macpeak and Seas

[57] ABSTRACT

The control unit 2 of an automobile includes: a ROM 2*b* for storing predetermined values representing normal (i.e., warmed-up) operating states of the engine, and a RAM 2*c* for storing cumulative values of outputs of various sensors. The cumulative values are continually compared with the predetermined values, and failure diagnosis of the engine is effected only when the cumulative values exceed the predetermined values.

4 Claims, 2 Drawing Sheets

FAILURE DIAGNOSIS DEVICE FOR AN AUTOMOTIVE ENGINE

BACKGROUND OF THE INVENTION

This invention relates to failure diagnosis devices for automotive engines, and more particularly to failure diagnosis devices which are capable of judging whether a proper condition for effecting failure diagnosis has been reached.

Generally, failure diagnosis devices for automotive engines (including the control devices for engines having a failure diagnosis function) effect the failure diagnosis of the control system of an automobile as follows. First, the operation states of the engine are detected after the water temperature, the rpm, and the air intake amount, etc., are within predetermined ranges. Then, the detected values are compared with preset operation states of the engine. If they are outside of predetermined ranges from the predetermined operation states, the system is judged to be in a failure, and the codes that are set within the failure diagnosis device are stored in memory and are displayed on a monitor display.

For example, a failure diagnosis of the exhaust gas recirculation (EGR) system is effected as follows. The outputs of EGR temperature sensor, etc., are detected when the rpm, the water temperature, the air intake amount, etc., of the engine are within predetermined ranges and hence the exhaust gas recirculation system is in an operable state. If the outputs of EGR temperature sensor, etc., are outside of normal ranges, the exhaust gas recirculation system is judged to be in failure. The failure codes set at the failure detection are stored in memory and displayed.

The above conventional failure diagnosis device has the following disadvantage.

The automobile must be driven for a certain mileage or time before an engine condition is reached under which the failure diagnosis can be effected properly. Thus, if the failure status is examined after the failure code has been cleared from the memory, a wrong judgment that the system is not in failure may be made by the failure diagnosis device, the judgment of which is based on the failure codes stored in the memory.

SUMMARY OF THE INVENTION

It is therefore an object of this invention to provide a failure diagnosis device which is capable of judging whether or not an operation condition has been reached under which failure diagnosis can be effected properly, such that the failure diagnosis is effected only after such condition is met. Thus, the failure diagnosis can be effected properly and reliably.

The above object is accomplished in accordance with the principle of this invention by a failure diagnosis device for an engine, comprising:

(a) detection means (various sensors) for detecting operation states of the engine;

(b) failure diagnosis means for effecting failure diagnosis of an engine in accordance with outputs of said detection means;

(c) first memory means (such as ROM) for storing predetermined values representing normal (i.e., warmed-up) operation states of the engine;

(d) second memory means (such as RAM) for storing cumulative values of outputs of said detection means;

(e) comparison judgment means for judging whether said cumulative values have exceeded said predetermined values; and (f) failure diagnosis condition judgment means for enabling said failure diagnosis means to effect failure diagnosis of the engine in response to an affirmative judgment of said comparison judgment means.

The procedure for effecting failure diagnosis of an engine by means of this failure diagnosis device may comprise, after the initialization of the diagnosis device, the steps of:

(a) setting in the ROM predetermined values representing normal operation states of the engine;

(b) setting in the RAM a code representing that an operation condition of the engine for effecting failure diagnosis is not satisfied;

(c) accumulating outputs of the detection means and storing cumulative values thereof in the RAM;

(d) comparing said cumulative values with said predetermined values to determine whether or not said cumulative values exceed said predetermined values; and (e) when the cumulative value exceed the predetermined value, enabling the failure diagnosis means to effect failure diagnosis of the engine in accordance with the outputs of the detection means.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENT

Referring now to the accompanying drawings, the preferred embodiment of this invention is described.

Figure 1:
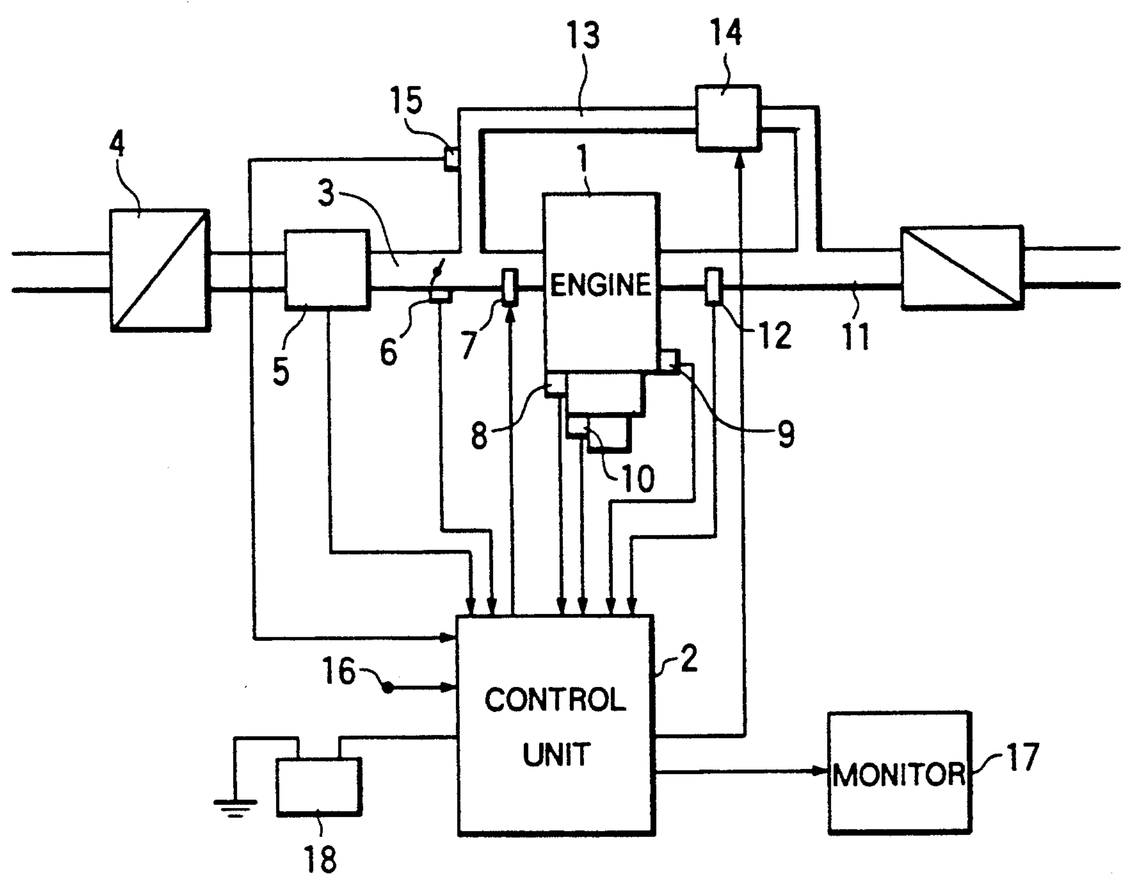
FIG. 1 is a block diagram showing the structure of a failure diagnosis device for an automotive engine according to an embodiment of this invention.

FIG. 1 is a block diagram showing the structure of a failure diagnosis device for an engine according to an embodiment of this invention. In FIG. 1, the output of the engine 1 is controlled by a control unit 2. The amount of air passing through an air intake path or manifold 3 provided with an air cleaner 4 is detected by an air amount sensor 5, the detection output of which is supplied to the control unit 2. The opening degree of a throttle valve for controlling the air intake amount of the engine 1 is detected by a throttle valve opening degree 6, the detection output of which is also supplied to the control unit 2. A fuel injector 7 injects fuel into the air intake path 3 under the control of the control unit 2. The fuel injected from the fuel injector 7 and the air taken in via the throttle valve are mixed within the air intake path 3 and are supplied to the cylinders of the engine 1.

Further, the rpm of the engine 1 is detected by a rotational speed sensor 8, and is supplied to the control unit 2. The rotational speed sensor 8 detects the rpm of the engine 1 in response to the pulses that are generated by a crank angle sensor at predetermined rotational angles of the crank shaft of the engine 1. The coolant water temperature of the engine 1 is detected by a water temperature sensor 9 and is supplied to the control unit 2. The car velocity is detected by a car velocity sensor 10 and supplied to the control unit 2. The exhaust manifold 11 is provided with an exhaust gas sensor 12, which detects the concentrations of components (such as oxygen gas) of the exhaust gas. The detection output of the exhaust gas sensor 12 is also supplied to the control unit 2.

An air intake bypass 13 communicating the air intake path or manifold 3 to the exhaust manifold 11 is provided with an actuator 14 for controlling an exhaust gas recirculation valve. The actuator 14 is controlled by the control unit 2, such that the amount of bypassing air passing through the air intake bypass 13 is controlled to a target value. An EGR temperature sensor 15 disposed on the air intake bypass 13 detects the temperature, and hence the operation state, of the exhaust gas recirculation system. The detection output of the EGR temperature sensor 15 is also supplied to the control unit 2.

Further, the output of a clutch/gear switch 16, which is turned on in response to the operations of the clutch or transmission gears (not shown), is supplied to the control unit 2. A monitor 17 displays the failure information under the control of the control unit 2, when the control unit 2 effects the failure diagnosis, etc.

The control unit 2 includes a memory means for storing the operation states of the engine 1. The battery for this memory means is backed up by a backup power source 18 coupled to the control unit 2.

Figure 2:
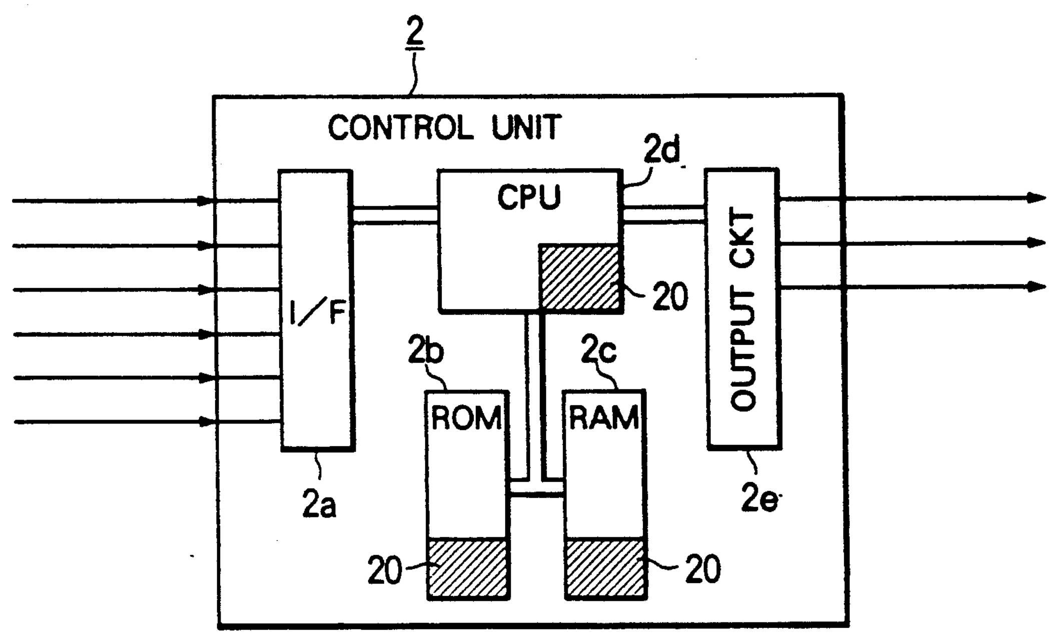
FIG. 2 is a block diagram showing the interior structure of control unit of FIG. 1.

FIG. 2 is a block diagram showing the interior structure of the control unit of FIG. 1. The control unit 2 is provided with an interface **2*a* via which are inputted the detection outputs of the various sensors for detecting the operation states of the engine 1, such as: the air amount sensor 5, the throttle valve opening degree sensor 6, the rotational speed sensor 8, the water temperature sensor 9, the car velocity sensor 10, the exhaust gas sensor 12, the EGR temperature sensor 15, and the clutch/gear switch 16. The control unit 2 includes: a ROM 2*b* for storing the data representing the predetermined normal operation states of the engine; a RAM 2*c* for storing the inputs from the above detection means and the current operation states of the engine; a CPU 2*d* for calculating and comparing the data stored in the ROM 2*b* and the RAM 2*c*; and an output circuit 2*e* for outputting the control signals to the fuel injector 7 and the actuator 14, etc., and for outputting the display data to the monitor 17**.

Further, the control unit 2 comprises a failure diagnosis device 20, which includes a ROM for storing the various preset conditions, a RAM for storing the failure codes and the operation states, and a CPU for effecting the failure diagnosis judgment. As indicated by the hatched blocks, the ROM, the RAM, and the CPU of the failure diagnosis device 20 may be implemented by portions of the ROM **2*b*, the RAM 2*c*,and the CPU of the control unit 2. The RAM 2*c* of the control unit 2 (including the RAM of the failure diagnosis device 20) is provided with the backup power source 18**.

The method of general failure detection operation of the failure diagnosis device 20 is well known in the art, as described, for example, in Japanese Patent Publication (Kokoku) Nos. 64-1737 and 1-14528, which are incorporated herein by reference.

Figure 3:
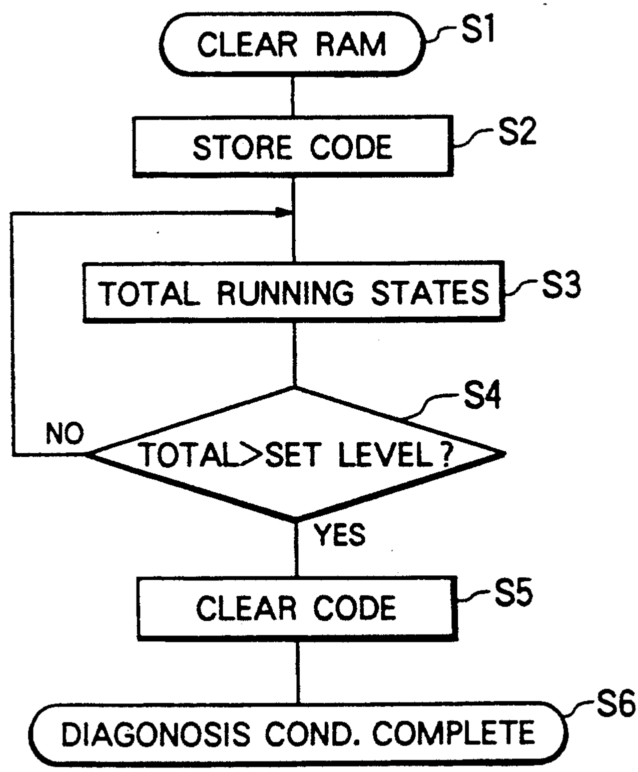
FIG. 3 is a flowchart showing the routine for determining whether the condition for effecting failure diagnosis is satisfied.

FIG. 3 is a flowchart showing the routine for determining whether the condition for properly effecting failure diagnosis is satisfied. When the backup power source 18 is switched off, the data stored in the RAM **2*c* (including the RAM of the failure diagnosis device 20, which stores the failure code) of the control unit 2 is cleared at step S1, and, at the subsequent step S2, a predetermined code representing the fact that the automobile has not yet been driven over sufficient distance or time for effecting the failure diagnosis properly is stored in the RAM 2*c***.

When the automobile begins to run, to the interface **2*a* of the control unit 2 is inputted, from moment to moment, the detection outputs from the various sensors such as: the air amount sensor 5, the throttle valve opening degree sensor 6, the rotational speed sensor 8, the water temperature sensor 9, the car velocity sensor 10, the exhaust gas sensor 12, and the EGR temperature sensor 15. Namely, to the interface 2*a* is inputted: the throttle opening degree from the throttle valve opening degree sensor 6; the rpm of the engine from the rotational speed sensor 8; the water temperature from the water temperature sensor 9; the oxygen concentration from the exhaust gas sensor 12; the temperature of the exhaust gas from the EGR temperature sensor 15; the mileage data from a mileage meter (not shown), etc. Thus, at step S3, the CPU 2*d*, receiving these detection signals from various sensors via the interface 2*a*, accumulates (or integrates) the respective detected values to obtain the cumulative or total amounts indicative of the operation or running states of the engine. The total amounts are successively stored in the RAM 2*c* as the data from the sensors arrive. At step S4, the CPU 2*d* compares the total amounts with the preset levels stored in the ROM 2*b*** representing the normal or warmed-up operation states of the engine.

When the total or cumulative amounts are judged at step S4 to be greater than predetermined levels, i.e., when an operation state of the engine in which the failure diagnosis judgment can be properly effected has been reached, the execution proceeds to the next step S5. On the other hand, when the judgment at step S4 is negative, i.e., when an operation state in which the failure diagnosis judgment can be effected properly has not yet been reached, the execution returns to step S3, to keep on accumulating the detection values of the various sensors in the RAM **2*c***.

At step S5, the predetermined code, set at step S2, representing the fact that the automobile has not yet reached the operation state in which the failure diagnosis can be effected is cleared from the RAM **2*c*. Further, at step S6, the CPU 2*d* urges the failure diagnosis device 20** to effect the failure diagnosis in accordance with a well known method described, for example, in the above-cited Japanese patents.

By the way, the predetermined levels with which the total or cumulative detection values are compared may be set in accordance with the test driving modes simulating actual driving conditions, such as the city and the highway modes of the NAS (North American Standard) test mode.

What is claimed is:

1. A failure diagnosis device for an engine, comprising:

(a) detection means for detecting operation states of the engine;

(b) failure diagnosis means for effecting failure diagnosis of an engine in accordance with outputs of said detection means;

(c) first memory means for storing predetermined values representing normal operation states of the engine;

(d) second memory means for storing cumulative values of outputs of said detection means;

(e) comparison judgment means for judging whether said cumulative values have exceeded said predetermined values; and (f) failure diagnosis condition judgment means for enabling said failure diagnosis means to effect failure diagnosis of the engine in response to an affirmative judgment of said comparison judgment means, and for judging whether or not said failure diagnosis has been completed on the basis of the cumulative values of the outputs of the detection means.

2. A failure diagnosis device as claimed in claim 1, wherein said first and second memory means comprise a ROM and a RAM, respectively.

3. A failure diagnosis device as claimed in claim 1, wherein said failure diagnosis means, first and second memory means, comparison and failure diagnosis condition judgment means are implemented by means of a microcomputer.

4. A method of effecting failure diagnosis of an engine by means of a failure diagnosis device according to claim 2, said method comprising the steps of:

(a) initializing said failure diagnosis device;

(b) setting in said ROM predetermined values representing normal operation states of the engine;

(c) setting in said RAM a code representing that operation condition of engine for effecting failure diagnosis is not satisfied;

(d) accumulating outputs of said detection means and storing cumulative values thereof in said RAM;

(e) comparing said cumulative values with said predetermined values to determine whether or not said cumulative values exceed said predetermined values;

(f) enabling said failure diagnosis means to effect failure diagnosis of the engine in accordance with the outputs of said detection means; and (g) judging whether or not said failure diagnosis has been completed on the basis of the cumulative values of the outputs of the detection means.

* * * * *